(12) United States Patent
Arai et al.

(10) Patent No.: US 7,120,705 B2
(45) Date of Patent: Oct. 10, 2006

(54) MAGNETIC DISK ARRAY DEVICE WITH PROCESSING OFFLOAD FUNCTION MODULE

(75) Inventors: Masahiro Arai, Kawasaki (JP); Naoto Matsunami, Hayama (JP); Ikuya Yagisawa, Tokyo (JP); Akihiro Mannen, Yokohama (JP); Masahiko Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 261 days.

(21) Appl. No.: 10/783,337

(22) Filed: Feb. 20, 2004

(65) Prior Publication Data

US 2005/0114557 A1   May 26, 2005

(30) Foreign Application Priority Data

Nov. 25, 2003   (JP)   ............................. 2003-393912

(51) Int. Cl.
*G06F 3/00*   (2006.01)
*G06F 15/16*   (2006.01)

(52) U.S. Cl. ......................................... 710/5; 709/236
(58) Field of Classification Search ...................... None
See application file for complete search history.

(56) References Cited

U.S. PATENT DOCUMENTS

| 5,835,703 | A | * | 11/1998 | Konno ........................ 714/42 |
| 5,905,885 | A | | 5/1999 | Richter et al. |
| 6,141,759 | A | * | 10/2000 | Braddy ........................ 726/14 |
| 6,381,675 | B1 | | 4/2002 | Okada |
| 6,421,760 | B1 | | 7/2002 | McDonald et al. |
| 6,496,900 | B1 | | 12/2002 | McDonald et al. |
| 6,526,458 | B1 | | 2/2003 | Steinmetz et al. |
| 6,834,326 | B1 | | 12/2004 | Wang et al. |
| 2002/0062387 | A1 | * | 5/2002 | Yatziv ........................ 709/236 |
| 2003/0041278 | A1 | | 2/2003 | Lin |
| 2003/0046472 | A1 | | 3/2003 | Morrow |
| 2004/0010660 | A1 | | 1/2004 | Konshak et al. |
| 2005/0097271 | A1 | | 5/2005 | Davies et al. |

FOREIGN PATENT DOCUMENTS

JP   2001-022526   1/2001

OTHER PUBLICATIONS

David A. Patterson et al., "A case for reducdant arrays of inexpensive disks (RAID)", Computer Science Division, Department of Electronic Engineering and Computer Science, 1998, pp. 109-116.

* cited by examiner

*Primary Examiner*—Kim Huynh
*Assistant Examiner*—Jasjit S. Vidwan
(74) *Attorney, Agent, or Firm*—Mattingly, Stanger, Malur & Brundidge, P.C.

(57) ABSTRACT

A magnetic disk array device is equipped with ATA magnetic disks, at least one disk array controller for controlling the ATA magnetic disks, and at least one processing offload function module provided between the disk array controller and the ATA magnetic disk. The disk array controller outputs one of a standard processing FC command for performing a standard processing such as a read or write processing, and an offload processing FC command for performing a vendor-unique offload processing. The processing offload function module performs a command mapping for the standard processing FC command and issues to the ATA magnetic disk a corresponding ATA command, and prepares a group of ATA commands for the offload processing FC command for optimum processing in an ATA protocol.

12 Claims, 11 Drawing Sheets

FIG. 4

DISK INFORMAITON MANAGEMENT TABLE 2063

| NO. | VENDER NAME | MODEL NAME | SERIAL NO. | CAPACITY | STATE | OFFLOAD FUNCTION ||||
|---|---|---|---|---|---|---|---|---|---|
| | | | | | | WRITE WITH PARITY COMPUTATION | RAID FORMAT | ONLINE VERIFICATION | DISK COPY |
| #0 | Hitachi | xxx-xxxxxxx | 7F0450370A | 200GB | GOOD | O | O | O | O |
| #1 | Hitachi | xxx-xxxxxxx | 7F0538432A | 200GB | GOOD | O | O | O | O |
| #2 | Hitachi | xxx-xxxxxxx | 7F327532EB | 200GB | GOOD | O | O | O | O |
| #3 | Hitachi | xxx-xxxxxxx | 8F3489601A | 200GB | GOOD | O | O | O | O |
| #4 | Hitachi | xxx-xxxyyyy | 3W6014601D | 200GB | GOOD | O | O | O | O |
| #5 | Hitachi | xxx-xxxxxxx | 2A3260112E | 200GB | GOOD | O | O | O | O |
| #6 | Hitachi | xxx-xxxxxxx | 8E5436292F | 200GB | GOOD | O | O | O | O |
| #7 | Hitachi | xxx xxxxxxx | 3A5236017F | 200GB | GOOD | O | O | O | O |
| #27 | Hitachi | xxx-xxxyyyy | 3H2160143D | 180GB | GOOD | O | × | O | O |
| #28 | Hitachi | xxx-xxxyyyy | 3B3541128A | 180GB | GOOD | O | × | O | O |

MAGNETIC DISK ARRAY DEVICE WITH PROCESSING OFFLOAD FUNCTION MODULE

BACKGROUND OF THE INVENTION

1. Field of the Invention

The present invention primarily relates to an external storage device system for computers, and especially to a technology for improving the performance of a magnetic disk array system (hereafter called "magnetic disk array device").

2. Description of the Related Arts

A conventional technology in which a magnetic disk array device (RAID device: Redundant Arrays of Inexpensive Disks device) records data with high reliability and at high-speed by distributing data processing and recording redundant data among a plurality of disks is widely used.

Generally, magnetic disk array devices have numerous disks mounted, and a disk array controller, which is an input/output control device, is mounted to store and process data appropriately distributed in and among the magnetic disks.

In addition to a function for performing a processing to store data in appropriate disks, the disk array controller also has a function to format a plurality of disks for RAID purposes, a function to calculate and write redundant data to prevent data loss even in the unlikely event of disk failure, and a failure preventive function to detect disks with signs of failure before failures occur; the disk array controller performs numerous control processing besides input/output to and from magnetic disks. For this reason, the disk array controller is required to have the performance to process data at high-speed, and improvements have been made to this end.

In the meantime, as another method for achieving high performance in the magnetic disk array device, there is an offload processing (a processing to remove load from the disk controller), wherein, instead of having the disk array controller handle all the processing, sub-controllers that are subordinate to the disk array controller are provided and a part of the processing is handled by the sub-controllers.

As a method for achieving high-speed processing through offload processing, multiple executions of a plurality of formats are performed by dividing a Fibre Channel loop into a plurality of loops and using a sub-controller provided for each loop.

By dividing the Fibre Channel loop through which data travels, data that travels on the loops can be localized and usage efficiency of a data bus of the controller can be improved. Further, it is possible to reduce I/O processing load on the controller by having the sub-controllers perform a part of the processing previously done by the controller. Moreover, processing such as copying between disks and online verification, which is a type of preventive maintenance, for checking the surface of disks online without stopping the device, can be done.

SUMMARY OF THE INVENTION

In terms of demands made on magnetic data disk array devices, although high performance of the magnetic disk array devices is demanded on one hand, with an explosive increase in data volume there is an emerging need among users on the other to utilize more inexpensive disks rather than expensive, conventional server disks as magnetic disks, which are the storage destination, for storing data according to business purpose and/or data type/importance. To meet such a need, there has been a trend in recent years to use in magnetic disk array devices for corporations ATA (AT Attachment) standard magnetic disks (hereinafter called "ATA disks") that have been used heavily in home PCs.

Compared to SCSI disks or Fibre Channel (hereinafter called "FC") disks that have been heavily used for primarily server purposes, ATA disks, which have built-in functions that are equivalent to an interface controller section of the host, do not require complicated circuits and can be manufactured cheaply.

In addition, different commands are allocated to address subtle differences in functions in control commands, which are logic specifications under the ATA standard, so that the disk controller does not have to make complicated decisions in ATA disks. For example, among write commands there are WRITE DMA (Direct Memory Access) for writing in DMA transfer when DMA mode is set and WRITE SECTORS for writing per unit sectors, in addition to a general WRITE command; furthermore, two types of commands, WRITE (RETRY) and WRITE (NO RETRY), are provided for each command depending on whether a retry processing is to be performed when there is a write failure.

In the meantime, in terms of physical specifications, since ATA disks are designed to be built-in in PCs that do not require numerous disks to be connected, Parallel ATA disks that are connected with parallel cables allow a maximum of only two disks to be connected per bus, and only one disk per bus in a point-to-point connection mode in Serial ATA (hereinafter called "SATA") that emerged in place of Parallel ATA for faster interface. In addition, cables between the controller and disks are limited to 1 m in length. For these reasons, in magnetic disk array devices in which numerous magnetic disks are stored in a plurality of magnetic disk storage housings and the magnetic disks are connected to a disk array controller, it is difficult to use ATA disks unaltered in terms of the connection mode and connection distance. Consequently, an FC-ATA conversion connection method, in which commands and physical interfaces are converted and connected to FC that has been conventionally used, is used in magnetic disk array devices.

With the FC-ATA conversion connection method, the disk array controller can treat ATA disks as if they were FC disks. The FC-ATA conversion connection method is executed by FC-ATA logical conversion, which can be realized by mapping ATA commands to corresponding FC commands, and by conversion of physical interfaces such as signal levels between ATA and FC.

This involves mapping similar commands between two protocols in an FC-ATA logical conversion section, but the two standards were established by different organizations and have completely different specifications. Consequently, functions that each standard is provided with are also naturally different, so that in reality there are some functions in the FC disks to which the ATA disks have no corresponding functions. ATA commands cannot be mapped for FC commands that call up such functions.

As a result, before issuing commands, the disk array controller must discriminate if the target of a command is an ATA disk that can accept an FC command through an FC-ATA conversion or a simple FC disk. Next, if the target is an ATA disk, the disk array controller must discriminate whether the command to be issued is convertible in an FC-ATA conversion; if the command is not a convertible command, the disk array controller must choose to either perform a virtually equivalent processing by combining other FC commands or cancel the command issue. Consequently, a processing for making the discrimination is required in the disk array controller, the load required for the processing increases, and this results in the possibility of performance decline.

On the other hand, from the perspective of ATA commands mapped, the only ATA commands that can be mapped from FC commands are those ATA commands for which there are equivalent FC commands. As described earlier, there is a plurality of commands of the same type for different purposes in the ATA. However, in the FC-ATA conversion, an FC command issued by the disk array controller must be mapped alternatively; in other words, the abundance of ATA commands is not fully utilized. Furthermore, ATA functions that have no corresponding functions in the FC standards cannot even be mapped to begin with.

When offload processing according to conventional technologies is applied to a magnetic disk array device using ATA disks as described, the following problems arise.

The first problem is an increase in command overhead. When sub-controllers are provided as in conventional technologies, although the processing by the disk array controller can be distributed through the offload processing, instructions from the disk array controller are developed by the sub-controllers into processing under FC commands, converted into ATA commands in the FC-ATA conversion section, and are propagated to ATA disks, which is a redundant route. The disk array controller, the sub-controllers, and the FC-ATA conversion section as components form a route in which they are connected in a cascade. Since responses to the processing also travel the same route in reverse, responses from disks to commands can suffer.

The second problem is that the FC-ATA conversion still fails to solve the problem that optimal ATA commands are not necessarily selected. Since sub-controllers are on the FC loop, commands they can issue are naturally FC commands. This causes a problem in selecting optimal ATA commands in the FC-ATA conversion.

The third problem is a reduction in the number of disks that can be connected due to ID resource consumption. For sub-controllers to directly receive instructions from the disk controller, the sub-controllers must be recognizable as devices on the FC loop, which requires the consumption of loop IDs. Although installing numerous sub-controllers makes multiple processing possible by that much, since IDs are consumed by the sub-controllers installed, the number of disks that can be connected is reduced in contradiction of a need for large capacity.

In view of the above, the present invention relates to a magnetic disk array device that realizes offload processing by reducing overhead caused by FC-ATA command conversions, utilizing optimal ATA commands, and eliminating the consumption of ID resources, while making it possible to use ATA disks.

In accordance with an embodiment of the present invention, a magnetic disk array device comprises at least one ATA magnetic disk, at least one disk array controller for controlling the ATA magnetic disk, and an interface card having at least one processing offload function module on a path between the disk array controller and the ATA magnetic disk. The disk array controller outputs to the interface card one of a standard processing FC command for performing standard processing, such as, for example, read or write, and an offload processing FC command for performing vendor-unique offload processing. The processing offload function module within the interface card uses a command mapping table to issue to the ATA magnetic disk an ATA command that corresponds to the standard processing FC command, and prepares a group of ATA commands for the offload processing FC command, which achieve optimal processing in the ATA protocol, as well as computes when necessary.

According to the present invention, offload processing becomes possible by minimizing the increase in the overhead caused by command conversions, realizing command conversions optimal for the logical interface of disks, and eliminating the consumption of ID resources, while making it possible to use ATA disks.

In addition, a plurality of types of magnetic disks having different logical interfaces can be operated with the same higher order commands.

Furthermore, since all offload processing commands are in formats that are used when normal (standard) commands are issued to target magnetic disks, by preparing an offload processing function for encrypting or decrypting received data before reading or writing the data and by performing all reading and writing through vendor-unique commands that call up this function, a disk array device with encryption function can be easily provided.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 4 is a diagram of the detailed structure of a disk information management table 2063 shown in FIG. 2.

PREFERRED EMBODIMENTS

[First Embodiment]

Figure 1:
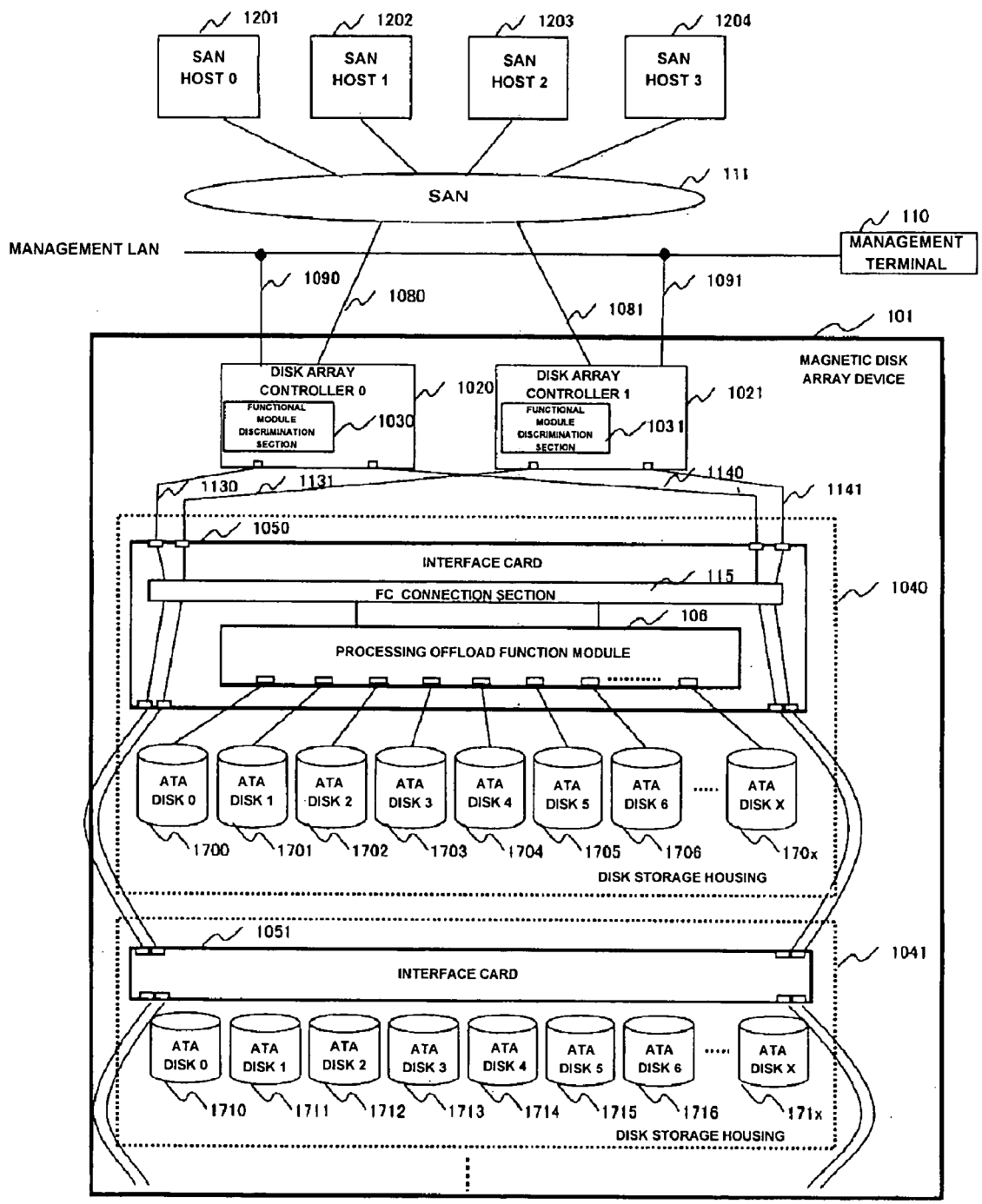
FIG. 1 is a block diagram of the overall configuration of a magnetic disk array device in accordance with a first embodiment of the present invention, in which a processing offload function module is mounted on an interface card of a magnetic disk storage housing.

FIG. 1 is a block diagram of the overall configuration of a magnetic disk array device in accordance with a first embodiment of the present invention, in which a processing offload function module is mounted on an interface card of a magnetic disk storage housing. In the drawing, "x" can be any integer.

A magnetic disk array device 101 (hereinafter called "disk array") is a secondary storage device accessed via a network called a SAN (Storage Area Network) 111 from at least one SAN client 120x. The SAN client 120x may also connect directly with the disk array 101 without going through the SAN 111. The magnetic disk array device 101 is provided with at least one disk array controller 102x for performing data transfer control on at least one ATA magnetic disk 17xx, as well as at least one magnetic disk storage housing 104x that stores a plurality of the ATA magnetic disks 17xx. The disk array storage housing 104x and the disk array controller 102x are connected by at least one Fibre Channel (FC) 113x or 114x.

Each magnetic disk storage housing 104x comprises of a plurality of ATA magnetic disks 17xx and an interface card 105x, and the disk array controller 102x transfers data to the magnetic disks 17xx through the interface card 105x. The interface card 105x comprises of an FC connection section 115 (e.g., a switch), which mutually connects the disk array controller 102x and the downstream magnetic disk storage housing 104x, and a processing offload function module 106, which is connected to the FC connection section 115, as shown in the drawing.

Although the disk array controller 102x is positioned externally to the magnetic disk storage housing 104x in FIG. 1, the disk array controller may be inside the magnetic disk storage housing according to the present invention. Furthermore, although two disk array controllers 102x are shown in the example in the drawing, there may be one or three or more.

Figure 2:
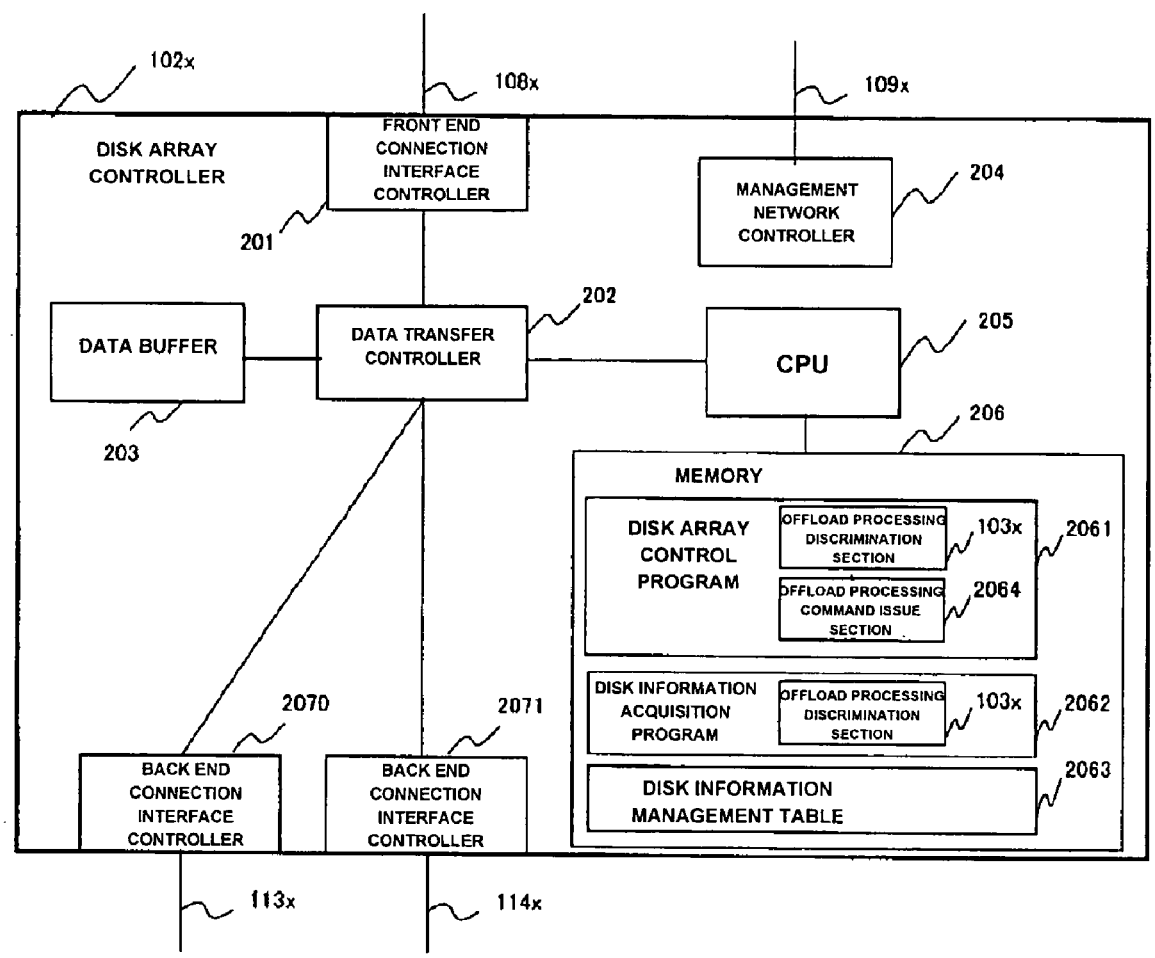
FIG. 2 is a diagram illustrating the internal configuration of a disk array controller according to the first embodiment of the present invention.

Next, FIG. 2 shows the internal configuration of the disk array controller 102x. A front end connection interface controller 201 is connected to the SAN 111 through an FC cable 108x to transfer data and to send and receive command data. There is at least one back end connection interface controller 207x, which sends and receives data to and from the ATA magnetic disks 17xx. A central processing control unit 205 operates a disk array control program 2061, which is stored in a memory 206. Besides the disk array control program 2061, the memory 206 is provided with a disk information acquisition program 2062 and a disk information management table 2063. At startup, the disk information acquisition program 2062 acquires information concerning the ATA magnetic disks 17xx connected, and it is provided internally with an offload processing discrimination section 103x for discriminating whether the processing offload function module (hereinafter called "function module") 106 is available and for discriminating usable offload processing. In addition to the offload processing discrimination section 103x, the disk array control program 2061 has a vendor-unique command issue section 2064 for offload processing.

A data transfer controller 202 moves data among the front end connection interface controller 201, the back end connection interface controller 207x and a data buffer 203 according to instructions from the disk array control program 2061 and/or the disk information acquisition program 2062.

A management network controller 204 is used for making changes to various monitoring and/or settings such as disk configuration, through a management terminal 110 via a management LAN 109x of each disk array controller 102x. The management terminal 110 may be directly connected to the management network controller 204 without going through the management LAN 109x.

Figure 3:
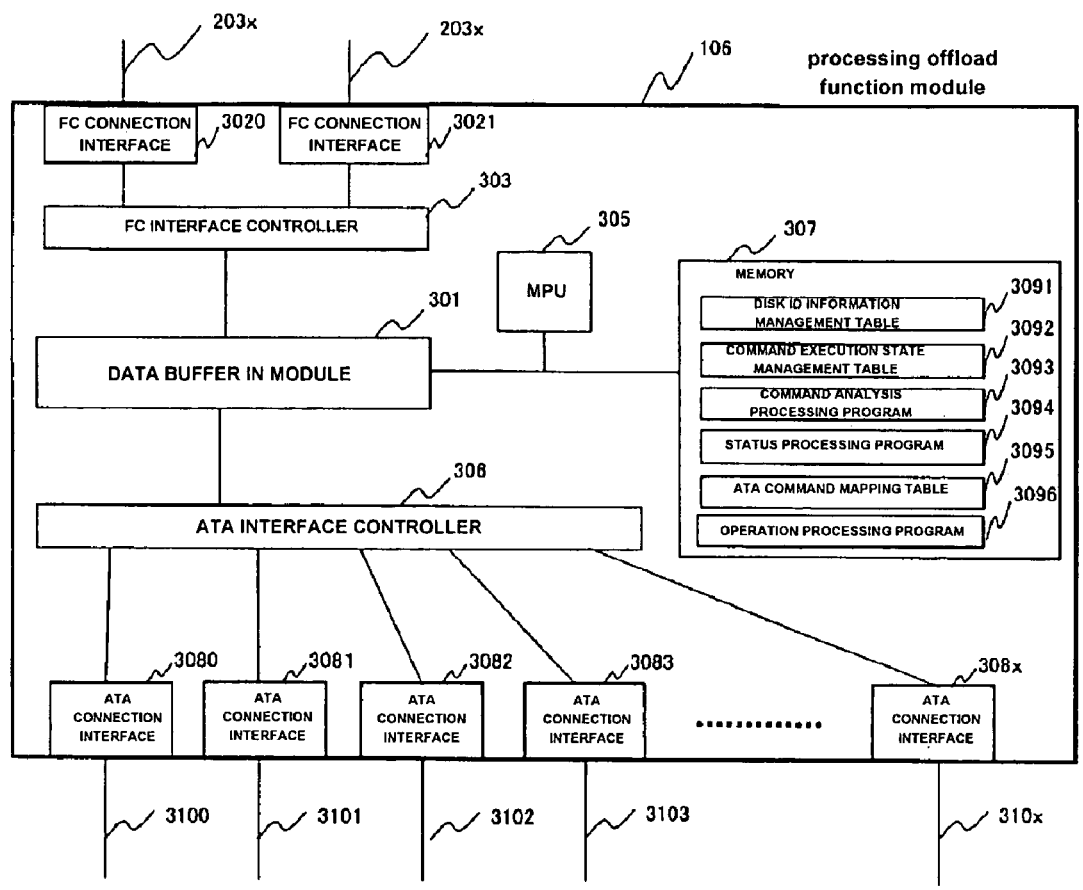
FIG. 3 is a diagram of the internal configuration of the processing offload function module according to the first embodiment of the present invention.

Next, FIG. 3 shows the internal configuration of the processing offload function module 106 according to the first embodiment of the present invention. FC connection interfaces 302x are connected to the FC connection section 115 via paths 203x. An FC interface controller 303 uses a data buffer 301 to send and receive data via the FC connection interface 302x. Similarly, ATA connection interfaces 308x connect to the ATA magnetic disk 17xx through ATA connection lines 310x, and an ATA interface controller 306 sends and receives data to and from the data buffer 301 and the ATA connection interfaces 308x.

An MPU 305 is a processing computation device that uses programs stored in a memory 307 to perform operation processing, command conversions, and control of the interface controllers 303, 306. Reference numeral 3091 denotes a disk ID information management table for managing correlation between FC IDs and the corresponding ATA magnetic disks 17xx. The concept of IDs does not apply to ATA magnetic disks, and the ATA magnetic disks cannot directly be assigned FC IDs. By recording the relationship between FC IDs and ATA connection interface numbers in the disk ID information table 3091, an indirect allocation of FC IDs is realized. Similarly, since ATA disks cannot be assigned WWNs, which are disk-unique identifiers assigned to FC disks, the correlation between WWNs and manufacturing numbers, which are unique numbers assigned to ATA magnetic disks, is also managed by the disk ID information table 3091.

Reference numeral 3092 denotes a command execution status management table for managing the execution status of each command in offload processing; commands, the execution status of each command, and a buffer address if data was received are recorded in the command execution status management table 3092. Reference numeral 3093 denotes a command analysis processing program, reference numeral 3094 denotes a status processing program, reference numeral 3095 denotes an ATA command mapping table, and reference numeral 3096 denotes an operation processing program.

Next, FIG. 4 shows the detailed configuration of the disk information management table 2063 in FIG. 2. Reference numeral 401 denotes a magnetic disk number managed in the magnetic disk array device 101, reference numeral 402 denotes the name of the manufacturer (vendor name) of the corresponding magnetic disk, reference numeral 403 denotes a product name (e.g. model name), and reference numeral 404 denotes a manufacturing number unique to each magnetic disk (e.g., serial number). Reference numeral 405 denotes the capacity of the corresponding magnetic disk. Reference numeral 406 denotes the status of each magnetic disk. Reference numeral 407 denotes at least one processing offload function provided by the function module 106 and indicates which function can be used on each magnetic disk. The offload functions shown in the drawing include write with parity computation, RAID format, multiple disk verification (i.e., online multiple disk verification), and disk copy functions. How information is acquired will be described later. The disk information management table 2063 may contain more items than shown in the drawing, and the order, names and/or descriptions of items may be different from the drawing.

Figure 5:
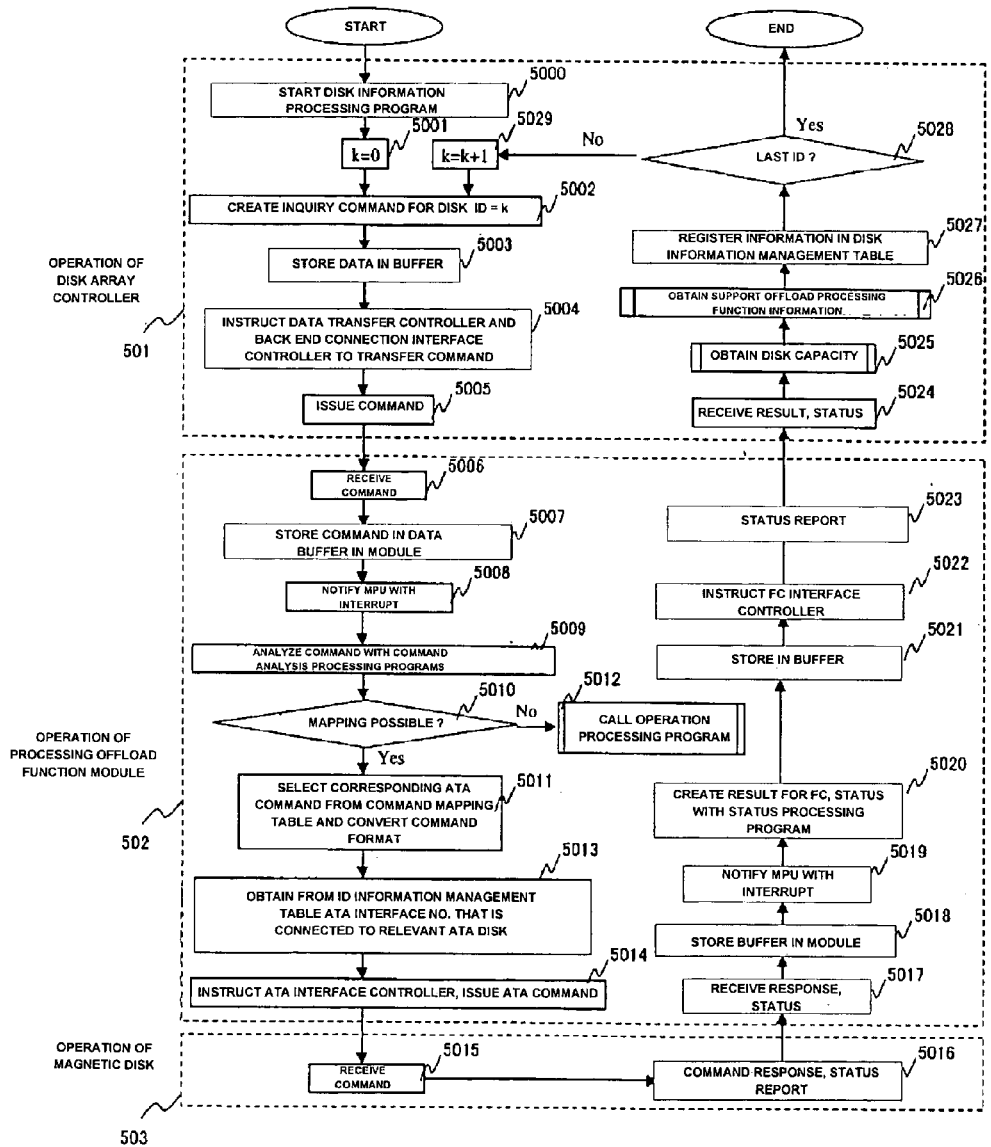
FIG. 5 is a flowchart of an operation of a disk information acquisition processing in the magnetic disk array device according to the first embodiment of the present invention.

An operation of a disk information acquisition processing in the magnetic disk array device according to the first embodiment of the present invention is described with reference to FIG. 5. FIG. 5 is a flowchart of an operation in which the disk information acquisition program 2062 of the disk array controller 102x recognizes the ATA magnetic disks 17xx used by the disk array controller 102x and registers information concerning the ATA magnetic disks 17xx in the disk information management table 2063 in FIG. 4. Processing inside a dotted line frame 501 indicate operations that take place in the disk array controller 102x; similarly, processing inside a dotted line frame 502 indicate operations that take place in the processing offload function module (function module) 106, and processing inside a dotted line frame 503 indicate operations that take place in each ATA magnetic disk 17xx.

When the power source to the magnetic disk array device 101 is turned on and initializing inside the disk array controller 102x finishes, the disk array controller 102x starts the disk information acquisition program 2062 (5000).

In order to acquire the status of all ATA magnetic disks 17xx connected to the disk array controller 102x, the disk information acquisition program 2062 designates an inquiry command, which is an FC command for checking disk configuration information, and FC IDs, which can uniquely specify individual ATA magnetic disks 17xx, and prepare them in the data buffer 203. In this case, let us assume that FC IDs begin with 0 (5001, 5002, 5003). When data are prepared in the data buffer 203, the disk information acquisition program 2062 gives instructions to the data transfer controller 202 (see FIG. 2) and the back end connection interface controller 207x (5004) and issues the command via the Fibre Channel 113x or 114x (5005).

The issued command is transmitted via the interface card 105x of each magnetic disk storage housing 104x. Although the disk array controller 102x issues the command to the ATA magnetic disk 17xx with the applicable ID, the ATA disks in reality cannot directly be assigned FC IDs. For this reason, the function module 106 manages correlation between the IDs and the ATA magnetic disks 17xx, and the function module 106 that manages the ATA magnetic disk 17xx that corresponds to the ID in the command receives the command in place of the ATA magnetic disk 17xx (5006).

When the function module 106 receives the command, the FC interface controller 303 inside the function module 106 stores the command in the data buffer in module 301 (5007) and notifies the MPU 305 with an interrupt (5008) of the storage of the command. When the notice arrives at the MPU 305, the command analysis processing program 3093 reads the command from the data buffer in module 301 and analyzes the command (5009). Through the analysis, the command analysis processing program 3093 determines whether the command can be mapped to an ATA command (5010).

If the command can be mapped, the command analysis processing program 3093 uses the command mapping table 3095 to select the corresponding ATA command; prepares the selected command, an ATA connection interface number that can be obtained through correlation with the FC ID from the disk ID information management table 3091 (ATA connection interface numbers and ATA disk numbers are correlated), and if necessary the storage address in the data buffer in module 301 for storing data that is obtained by executing the command; and prepares the three items in the data buffer 301 (5011). If the command cannot be mapped, the command analysis processing program 3093 transfers the processing to the operation processing program 3096, such that an appropriate processing takes place (5012). Detailed operations that take place when a processing is transferred to the operation processing program 3096 will be described in a separate processing.

When the command is prepared in the data buffer 301, the command analysis processing program 3093 gives an instruction to the ATA interface controller 306 and issues the command to the ATA magnetic disk 17xx via the ATA connection interface 308x with the number designated in the data buffer in module 301 (5014).

When the ATA magnetic disk 17xx responds to the command (5016), the response travels via the ATA connection interface 308x, and the ATA interface controller 306 stores the response in the data buffer 301 (5018) and notifies the MPU 305 that the response has been stored (5019).

Next, in reverse order from the procedure described above, the status processing program 3094 creates a status for the FC command based on the corresponding response content (5020), stores the status in the data buffer 301 (5021), gives an instruction to the FC interface controller 303 (5022), and reports the status to the disk array controller 102x (5023). The disk array controller 102x obtains the result of the command through the series of operations described, and since it appears to the disk array controller 102x as though the ATA magnetic disk 17xx responded directly, the intervention by the processing offload function module 106 in the processing process is transparent to the disk array controller 102x.

Upon receiving the report, the magnetic disk array device 101 obtains the capacity of the ATA magnetic disk 17xx through a READ CAPACITY command following a similar procedure (5025). The disk array controller 102x uses a vendor-unique command to query information regarding an offload processing function that can be used on the disk (5026) and registers the information obtained in the disk information management table 2063 (5027). The processing for the vendor-unique command will be described later. When one ATA magnetic disk 17xx is processed, a similar process is repeated until the last ID is reached (5028, 5029).

The disk information is registered in the manner described above, but other methods may be used as long as information can be obtained for all disks. A vendor-unique command that allows information for all disks connected to the function module to be obtained through one command can be prepared, so that information is obtained through the vendor-unique command. The management information shown in the disk information management table 2063 in FIG. 4 is merely an example, and items, information and/or registration descriptions may be different.

Figure 6:
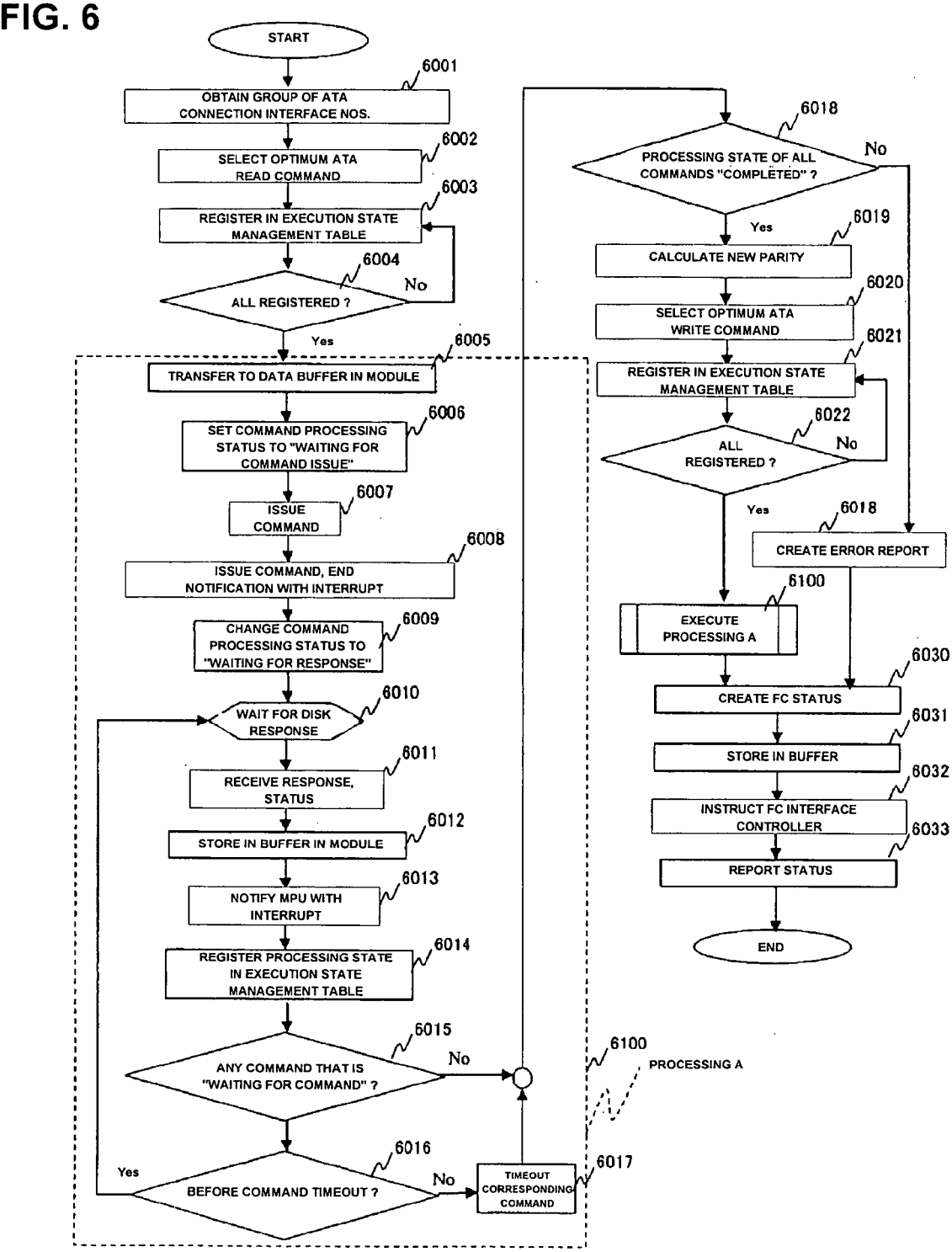
FIG. 6 is a flowchart of an operation of write with parity computation as an example of an offload processing for sending different commands to a plurality of disks in the magnetic disk array device according to the first embodiment of the present invention.

Next, an offload processing for sending different commands to a plurality of ATA magnetic disks 17xx in the magnetic disk array device 101 according to the first embodiment of the present invention is described below. As an example of an offload processing for sending different commands to a plurality of disks, operations of write with parity computation will be described. FIG. 6 shows a process (step 5012 in FIG. 5) that takes place when an operation processing program is called up in step 5010 in FIG. 5.

Upon receiving a command and write data from the host 120x, the disk array controller 102x determines in the process of a processing by the disk array control program 2061 whether parity computation is required. If parity computation is required, the disk array control program 2061 refers to the disk information management table 2063 and discriminates whether the ATA magnetic disks 17xx that are the data write destinations can execute the offload processing. If as a result of the discrimination, the ATA magnetic disks 17xx are found to be able to execute the offload processing, a vendor-unique command for instructing the processing is created and issued through the operations in steps 5003–5005 to one of the ATA magnetic disks 17xx that is the write data destination. The command contains such information as a command identification number, an ID list comprising IDs of the disks that are the write data destinations and IDs of the disks that are the write parity destinations, and write data length. There may be a plurality of IDs of disks that are write data destinations on the list.

When the function module 106 that manages the ATA magnetic disks 17xx for which the command has been issued receives the command, the function module 106 stores the command and the new data to be written in the data buffer in module 301 through the operation of step 5007 in FIG. 5. Next, the command analysis processing program 3093 begins a command analysis through the operation of step 5009. Since the command is a vendor-unique command for performing offload processing, the processing is taken over by the operation processing program 3096 through the operations of steps 5010 and 5012 in FIG. 5.

The purpose of the operation processing program 3096 is to prepare a group of commands that would result in the optimal processing according to the ATA protocol in order to achieve the offload processing given, perform computation if necessary, achieve the target processing, and to report the result to the disk array controller 102x. The operation by the operation processing program 3096 calculates new parity data through computation based on new data, old data and old parity data, and to write the new data and new parity data to the ATA magnetic disks 17xx. The processing can be generally divided into three stages: reading the old data and old parity (processing A), calculating the new parity (processing B), and writing the new data and new parity (processing C).

First, the operation processing program 3096 obtains from the analysis result of the command analysis processing program 3093 a group of IDs of the ATA magnetic disks 17xx that are write data destinations and the ID of the ATA magnetic disk 17xx that is the write parity destination, and obtains from the disk ID information management table 3091 the corresponding ATA connection interface numbers in sequence, in order to realize the old data and old parity reading processing (processing A) (6001). Next, the operation processing program 3096 selects the ATA read command that is optimal for the processing (6002); repeats the number of times equal to the number of the ATA magnetic disks 17xx required for data or parity read the operations concerning the command, the ATA connection interface number, and data storage address in the data buffer in module 301 for storing the data read; and registers the information in the command execution status management table 3092 (6003, 6004). Since the ATA read command that is optimal for the processing is a command with which the old data and old parity reading processing can be done at high-speed and reliably, a READ DMA (RETRY) command, which can transfer data at high-speed and retries if there is a read failure, is used. When the commands are registered, the information in the command execution status management table 3092 is transferred to the data buffer in module 301 (6005), and the processing status of each command in the command execution status management table 3092 is set to "waiting for command issue" (6006).

When the commands are registered in the data buffer in module 301, the operation processing program 3096 instructs the ATA interface controller 306 to issue the series of commands (6007). Upon issuing the commands, the ATA interface controller 306 notifies through an interrupt the end of the issue processing (6008). Upon receiving the issue end interrupt, the operation processing program 3096 changes the processing status of the commands registered in the command execution status management table 3092 to "waiting for response" (6009).

Next, when one of the ATA magnetic disks 17xx receives the command, completes data transfer, and sends a response status (6011, 6012), the ATA interface controller 306 notifies through an interrupt to the operation processing program 3096 that the response status has been received (6013). The operation processing program 3096 reads the status from the data buffer in module 301; if it is a success, the operation processing program 3096 sets the processing status of the command to "completed" in the command execution status management table 3092 and registers in the command execution status management table 3092 the data buffer address storing the data read; if it is a failure, the operation processing program 3096 treats it as an error and registers the error content as the processing status (6014).

When the processing status of all the commands in the command execution status management table 3092 become "completed," the operation processing program 3096 transitions to the new parity calculation processing in the three stages. If there is even one error in the command execution status management table 3092, the operation processing program 3096 creates an error report, notifies of the error to the disk array controller 102x, and terminates the offload processing without transitioning to the subsequent new parity calculation processing or the new data and new parity write processing (6018). The error report is notified with the error notice to the disk array controller 102x. If there is a command in the command execution status management table 3092 whose status is "waiting for response," the command is processed as an error due to timeout if there is no response after a certain amount of time (6015, 6016, 6017).

Upon transitioning to the new parity calculation processing (processing B) in the three stages, the operation processing program 3096 performs an exclusion operation processing based on the old data and old parity data obtained through a read processing of the new data, old data and old parity that were stored in a data buffer address designated in advance, and calculates the new parity data (6019). Parity data may be calculated using other methods, and although there is only one parity data in FIG. 6, there may be a plurality of parity data.

Next, the operation processing program 3096 transitions to a new data and new parity write processing (processing C) in the three stages, where it selects the optimal ATA write commands, registers in the command execution status management table 3092 the command, the connection interface number the corresponding ATA magnetic disk 17xx is connected to, and the buffer address storing the write data for each ATA magnetic disk 17xx that is the target of writing (6020, 6021, 6022); the operation processing program 3096 then stores the commands in the data buffer in module 301, instructs the ATA interface controller 306 to issue the commands, and waits for responses from the ATA magnetic disks 17xx, as in the old data and old parity read processing (6100). Since it is desirable for a data write to take place reliably and at high-speed in a write with parity computation, WRITE DMA (RETRY) is used as the ATA commands.

Upon receiving a report through the ATA interface controller 306 that the new data and new parity have been written, the operation processing program 3096 creates an FC status (6030), reports to the disk array controller 102*x* (6033), and terminates the offload processing.

The following is a description of a processing for sending an identical command to a plurality of the ATA magnetic disks 17*xx* in the magnetic disk array device 101 according to the first embodiment of the present invention. As an example of a processing for sending an identical command to a plurality of ATA magnetic disks 17*xx*, an operation of an online verification processing will be described. Online verification is a maintenance work for the purpose of detecting multiple disks with signs of failure by checking the surface of disks asynchronously with I/O from the host.

Normally, when a disk array controller performs an online verification, a VERIFY command is issued a plurality of times to each disk until the entire disk is checked, and the processing is repeated the number of times equal to the number of disks. According to the present invention, by issuing one command, which contains a command identification number and a list of IDs of disks that are targets of simultaneous execution, as an offload processing command to a representative disk, it makes it possible for the online verification processing to be executed simultaneously on all target disks. The following is a description of the operation.

When there are disks that require online verification due to a timing such as the length of time elapsed for an operation, the disk array controller 102*x* makes a list of IDs of the ATA magnetic disks 17*xx* that are targets of execution. Although the number of disks that become the target may be singular, a plurality of disks is assumed in the present description. Using a command identification number and an FC ID list for the ATA magnetic disks 17*xx* requiring the online verification processing, the disk array controller 102*x* creates a vendor-unique command for executing an online verification offload processing and issues the command to the representative disk. The representative disk is one of the ATA magnetic disks 17*xx* that are assigned IDs on the list. The procedure for the disk array controller 102*x* to issue the command is similar to the operation that takes place in steps 5003–5005 and FIG. 5, where the command and send destination IDs are stored in the data buffer 203 and instructions are given to the data transfer controller 202 and the back end connection interface controller 207*x*.

When the function module 106 that manages the IDs receives the command, the command analysis processing program 3093 discriminates the command received as an offload processing command and sends the processing to the operation processing program 3096. The operation processing program 3096 prepares in the data buffer in module 301 a command for performing verification on each ATA magnetic disk 17*xx* that corresponds to the IDs on the list. Verification can be done in a method that checks only ECC information provided for each sector of a disk or in a method that checks whether an entire sector can be read; due to the fact that the former method does not check whether data stored in sectors can be read, its reliability is low.

In the present description, the verification of an entire sector according to the latter method should be considered, but a verification command for checking an entire sector is not available in ATA commands. For this reason, an equivalent function will be realized through a READ SECTORS (NO RETRY) command, which attempts to read on a per sector basis and responds immediately with an error without attempting to retry if it fails, to check whether data can be read on a per sector basis.

When the command is registered in the command execution status management table 3092 so that the command would be executed on all target disks, the operation processing program 3096 prepares the command list in the data buffer in module 301, gives an instruction to the ATA interface controller 306, and issues the command. When there is a response from every ATA magnetic disk 17*xx* to the command and if there are no errors among the responses, the operation processing program 3096 checks the next sector of each ATA magnetic disk 17*xx* following the same method and procedure described. This is repeated until the last sector of the ATA magnetic disks 17*xx* is reached. If an error occurs, the operation processing program 3096 creates an error report that specifies the ATA magnetic disk 17*xx* and sector position of the error and continues the processing.

When all of the sectors are checked, the operation processing program 3096 reports the disk array controller 102*x* of the completion of the checking and terminates the offload processing.

Figure 11:
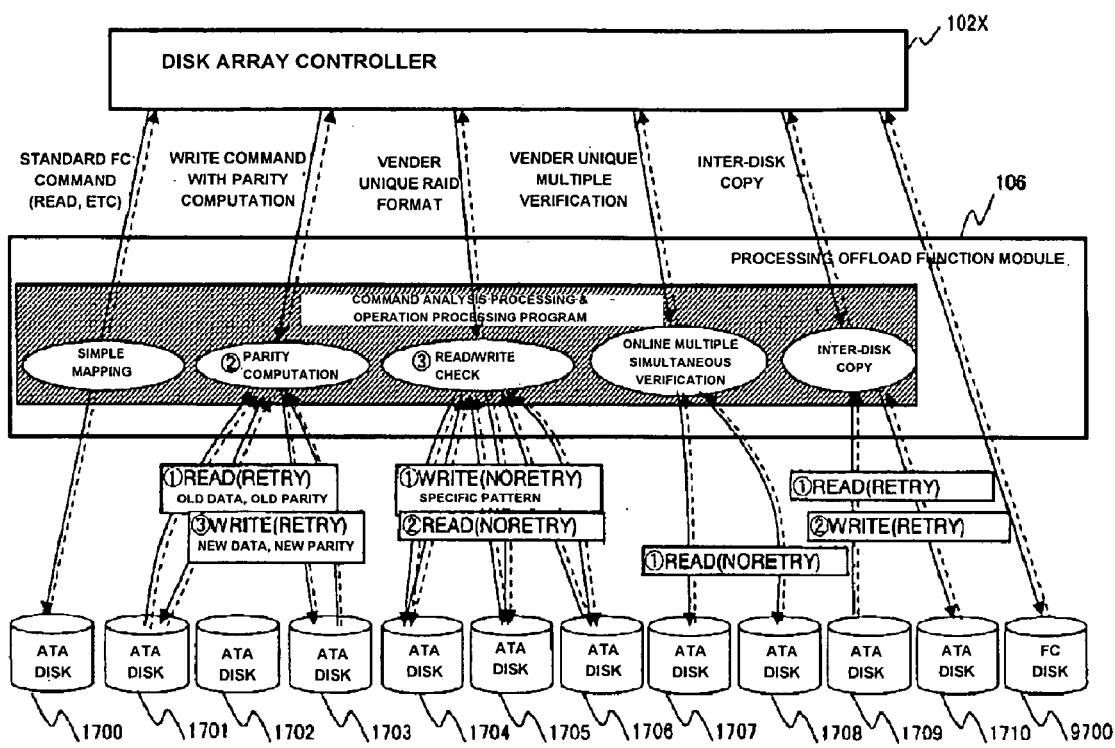
FIG. 11 is a diagram illustrating the summary of processing modes of a disk array controller and a processing offload function module in a magnetic disk array device in accordance with an embodiment of the present invention.

The following is a further description of the summary of the magnetic disk array device according to the first embodiment of the present invention in conjunction with FIG. 11. FIG. 11 is a diagram illustrating the summary of processing modes of the disk array controller 102*x* and the processing offload function module 106 of the magnetic disk array device according to the embodiment of the present invention.

Based on a command and data from the host, the disk array controller 102*x* creates a normal (standard) command (e.g., read, write) or a vendor-unique (original to manufacturer) command (e.g., write with parity computation, RAID format, online multiple verifications, copy between disks (see FIG. 4)) and outputs the command to the processing offload function module 106. As shown in FIG. 3, the processing offload function module 106 is provided with the command analysis processing program 3094, the operation processing program 3096, and the ATA command mapping table 3095, etc.; the processing offload function module 106 uses the command analysis processing program 3092 to analyze each FC command from the disk array controller 102*x* and determine whether the command can be mapped to an ATA command, and if the command from the disk array controller 102*x* is a standard FC command, the processing offload function module 106 selects a corresponding ATA command from the ATA command mapping table 3095 and issues the ATA command to the appropriate ATA magnetic disk 17*xx*.

In FIG. 11, of the four vendor-unique commands, the RAID format and online multiple verification commands are offload processing commands that are disk array controller vendor-unique, while the write with parity computation and copy between disks commands are offload processing commands that are disk vendor-unique. Disk vendor-unique FC commands from the disk array controller 102*x* (FC commands from the disk array controller 102*x* designate FC disk IDs) are issued to appropriate FC disks without being processed by the function module 106 if the FC disks are among the group of disks.

Vendor-unique FC commands are determined by the command analysis processing program 3093 as commands that cannot be mapped to ATA commands in 1:1 ratio and are taken over by the operation processing program 3096 in the function module 106, where the vendor-unique FC commands are processed according to the flow shown in FIG. 6.

To describe this using an example of a write command with parity computation in FIG. 11, a READ (RETRY) command for old data and old parity is issued to the ATA magnetic disks 17xx, parity computation takes place, and new data and new parity are written to the ATA magnetic disks 17xx in WRITE (RETRY). In FIG. 11, solid lines indicate the flow of data and dotted lines indicate the flow of status.

Due to the fact that IDs are not assigned to ATA magnetic disks 17xx according to the present embodiment, the processing offload function module 106, which is a sub-controller, manages the ATA magnetic disks 17xx. Since the disk array controller 102x issues commands to subordinate IDs, the commands from the disk array controller 102x are all first received and processed by the sub-controller before they are issued to the ATA magnetic disks 17xx. In other words, since the disk array controller 102x issues commands to the subordinate disk IDs, the disk array controller 102x does not see the sub-controller (i.e., the sub-controller has a function of transparently showing the disks to the disk array controller).

In the meantime, in conventional technologies, sub-controllers and FC disks form an FC loop that is subordinate to a disk array controller, and each sub-controller and FC disk is assigned an ID in the FC loop (according to the FC standards, 127 sub-controllers and FC disks can be installed per loop); since the disk array controller manages the sub-controllers and FC disks by their IDs, the disk array controller must issue commands to the sub-controllers and FC disks while recognizing that they are different, which in some cases could cause the command execution order not to be guaranteed (for example, a problem such as data write to an FC disk taking place first, instead of data write taking place after data read from an FC disk, as it should be, could occur). Furthermore, since sub-controllers and an FC-ATA conversion section are separately connected in cascade according to the conventional technologies, even if an FC command for offload processing is issued by a sub-controller, an ATA command that corresponds in a 1:1 ratio to the FC command inputted is often not found in the FC-ATA conversion section.

In the present embodiment of the present invention, by having the command analysis processing program, the operation processing program and the ATA command mapping table, etc. shown in FIG. 3 provided within the processing offload function module to execute the processing flows shown in FIGS. 5 and 6, the offload processing can be developed into ATA commands inside the processing offload function module and FC commands that cannot directly be mapped can be converted into and used as ATA commands. Furthermore, due to the fact that the function module (a sub-controller) according to the present embodiment manages the correlation between FC loop IDs and ATA disks, the function module does not have to have its own ID, which means that an ID that would be managed by the disk array controller is not used (consumed) by the function module. Moreover, according to the present embodiment, the disk array controller does not have to be aware of the differences among standard commands, disk vendor-unique commands (write with parity computation, copy between disks), and controller vendor-unique commands (RAID format, online multiple verifications) and sort them to issue commands accordingly; instead, the disk array controller can simply issue commands to target disk IDs (since the function module receives all commands and manages the disks).

In this way, according to the magnetic disk array device of the first embodiment of the present invention, command conversion-related overhead can be minimized when executing offload processing FC commands, since the offload processing FC commands are directly converted into ATA commands and processed. In addition, ATA commands that are optimal for the content of offload processing can be used for processing. Further, using a method similar to the present embodiment, data can be copied between drives and RAID format processing can be performed on a plurality of disks.

[Second Embodiment]

Figure 7:
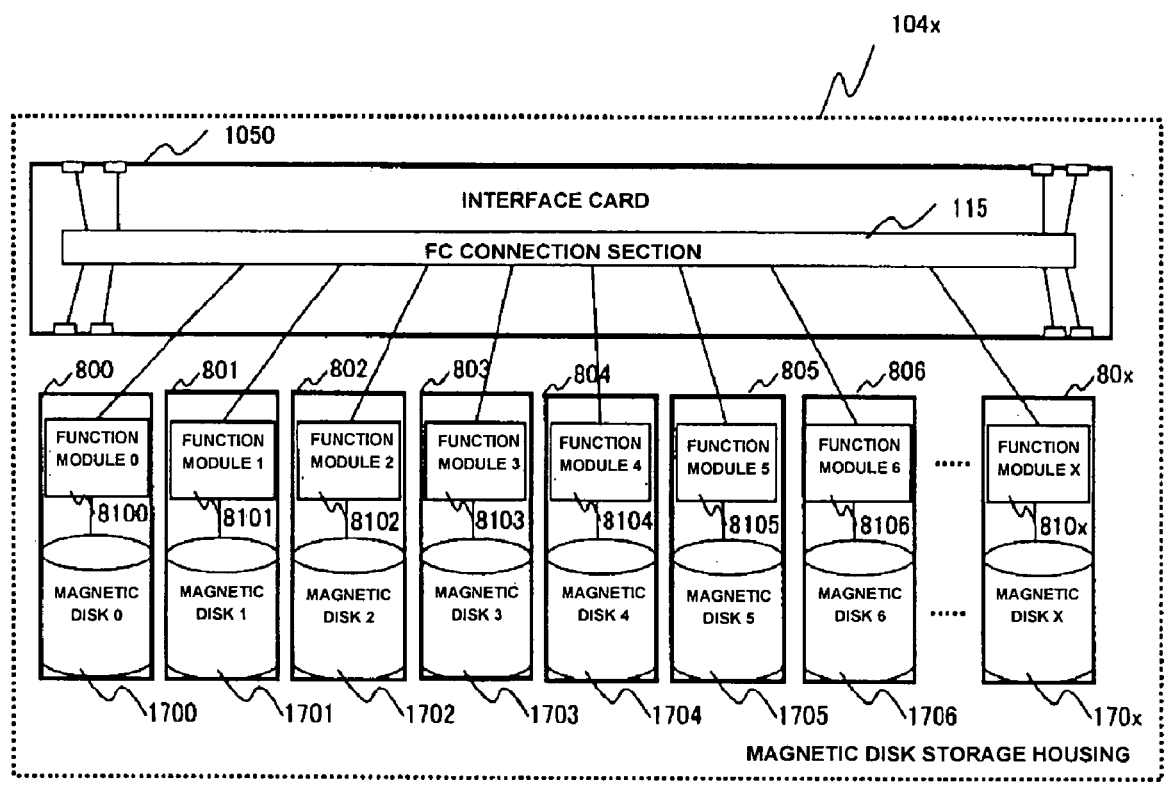
FIG. 7 is a block diagram of the overall configuration of a magnetic disk array device in accordance with a second embodiment of the present invention, in which a processing offload function module is mounted in a magnetic disk storage housing canister.

FIG. 7 is a block diagram of the overall configuration of a magnetic disk array device according to the second embodiment of the present invention, in which a processing offload function module is installed in each magnetic disk storage housing canister. In FIG. 7, reference numeral 80x denotes at least one canister (a disk container) and reference numeral 810x denotes a processing offload function module built-in into each canister 80x.

Figure 8:
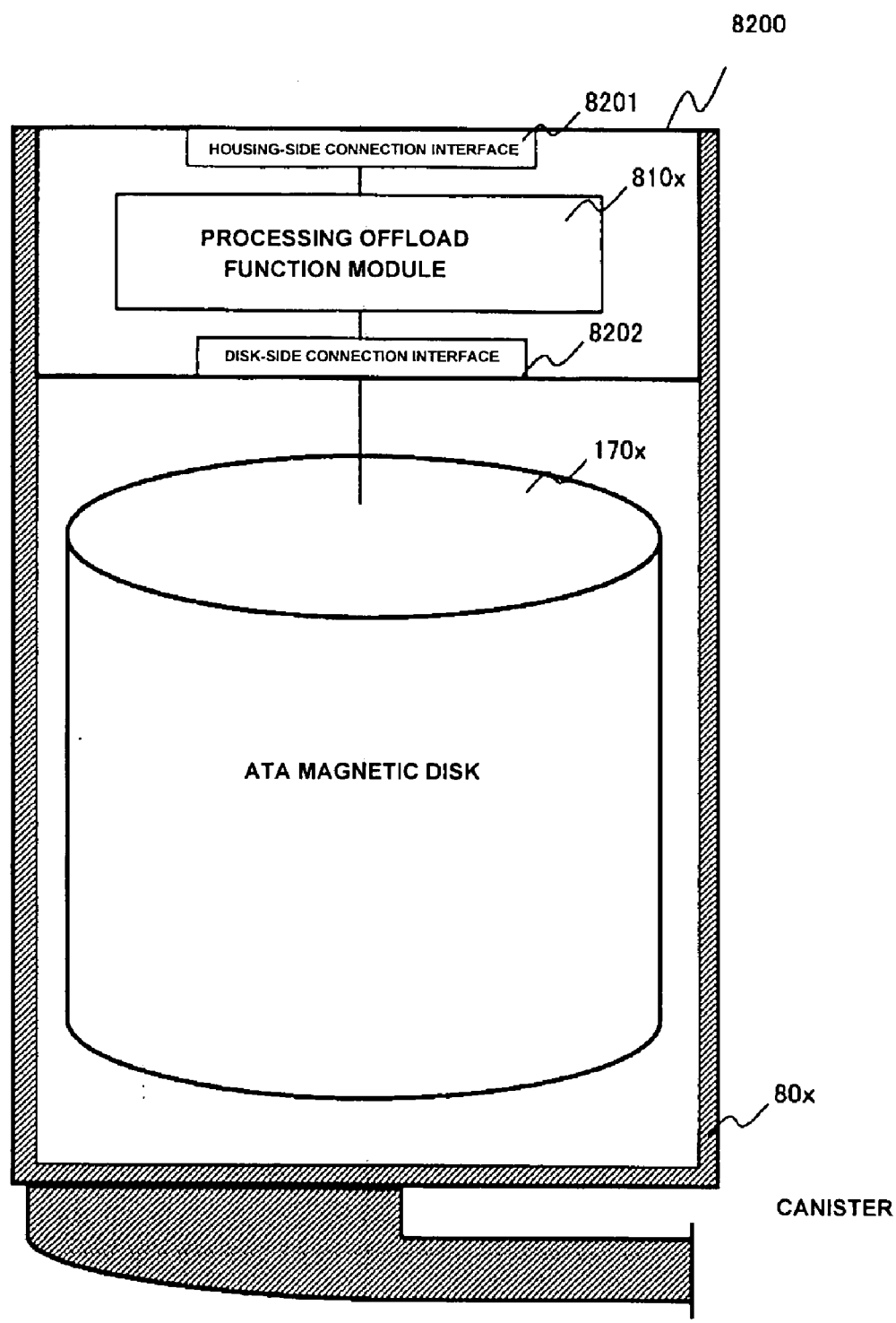
FIG. 8 is a diagram of the internal configuration when the processing offload function module is installed inside the canister according to the second embodiment of the present invention.

FIG. 8 shows the internal configuration of the canister 80x when the processing offload function module 80x is installed inside the canister 80x. Reference numeral 8200 denotes a connector board on which is mounted the processing offload function module 810x according to the second embodiment, and is provided with a magnetic disk storage housing-side connection interface 8201 and a disk-side connection interface 8202.

According to the second embodiment of the present invention, effects similar to the first embodiment can be obtained and offload processing can be performed on a disk-by-disk basis. Since transfer of data that occurs in the offload processing is limited to transfer within one canister 80x, the data bus efficiency improves. Furthermore, parallel multiplicity of the processing increases, so that per-unit time processing performance can be improved without applying almost any load on a disk array controller or on a bus that connects to the array controller.

[Third Embodiment]

Figure 9:
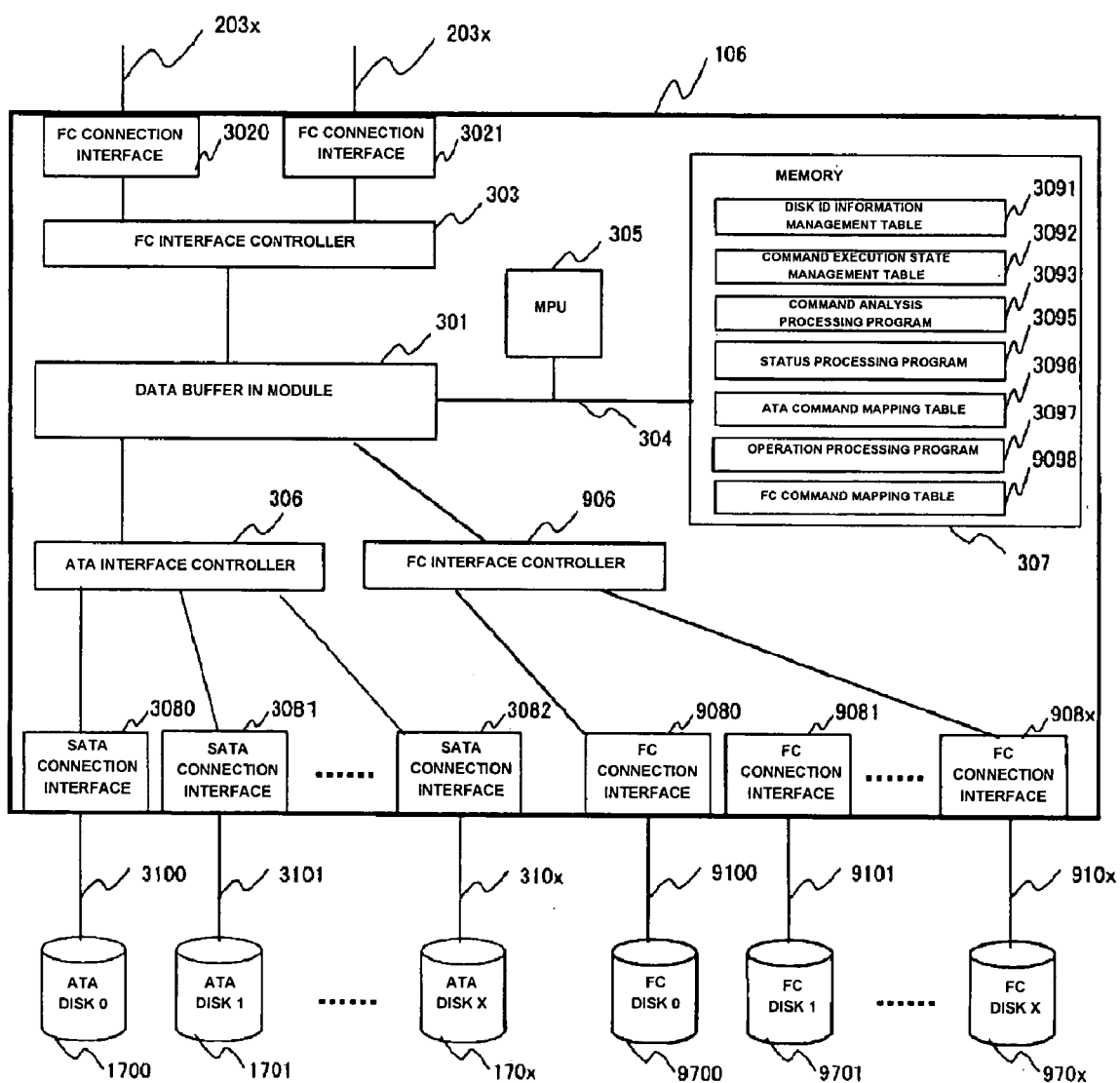
FIG. 9 is a block diagram of a processing offload function module of a magnetic disk array device in accordance with a third embodiment of the present invention, in which FC disks and ATA disks can both the mounted.

FIG. 9 is a block diagram of a processing offload function module in a magnetic disk array device in accordance with a third embodiment of the present invention, in which FC disks and ATA disks can both be installed. FIG. 9 shows the internal configuration of a processing offload function module 106 when a part of ATA disks contained in one magnetic disk storage housing 104x is replaced with FC disks.

In addition to the components in the configuration of the first embodiment of the present invention, the function module 106 is provided with the following in order to realize the mix mounting of FC disks and ATA disks: at least one FC connection interface 908x for connecting with FC disks 970x, an FC interface controller 906 for controlling the FC connection interface 908x, and an FC command mapping table 9098 for developing each offload processing into an appropriate group of FC commands.

The following is a description of the difference between the operation according to the present embodiment and operation according to the first embodiment of the present invention. When an FC interface controller 303 receives a command via an FC connection interface 302x in the upstream, a command analysis processing program 3093 refers to a disk ID information management table 3091 and discriminates whether the command is directed at an ATA disk or an FC disk. If the command sent is a normal FC command and is directed at an FC disk, the function module 106 allows the FC command to pass without any conversion; if the command sent is directed at an ATA disk, the function module 106 uses an ATA command mapping table 3096 to convert the command into an optimal group of ATA commands.

If the command received is an offload processing command, the command analysis processing program 3093 transfers the processing to a operation processing program 3097, where the command received is converted into an optimal group of commands and processed according to the type of target disk and the content of the processing.

According to the third embodiment of the present invention, in addition to the effects obtained in the first embodiment, different types of disks can be operated through one higher order command, and the higher order command can be processed using an optimal group of commands according to the type of disk and processing content.

[Fourth Embodiment]

Figure 10:
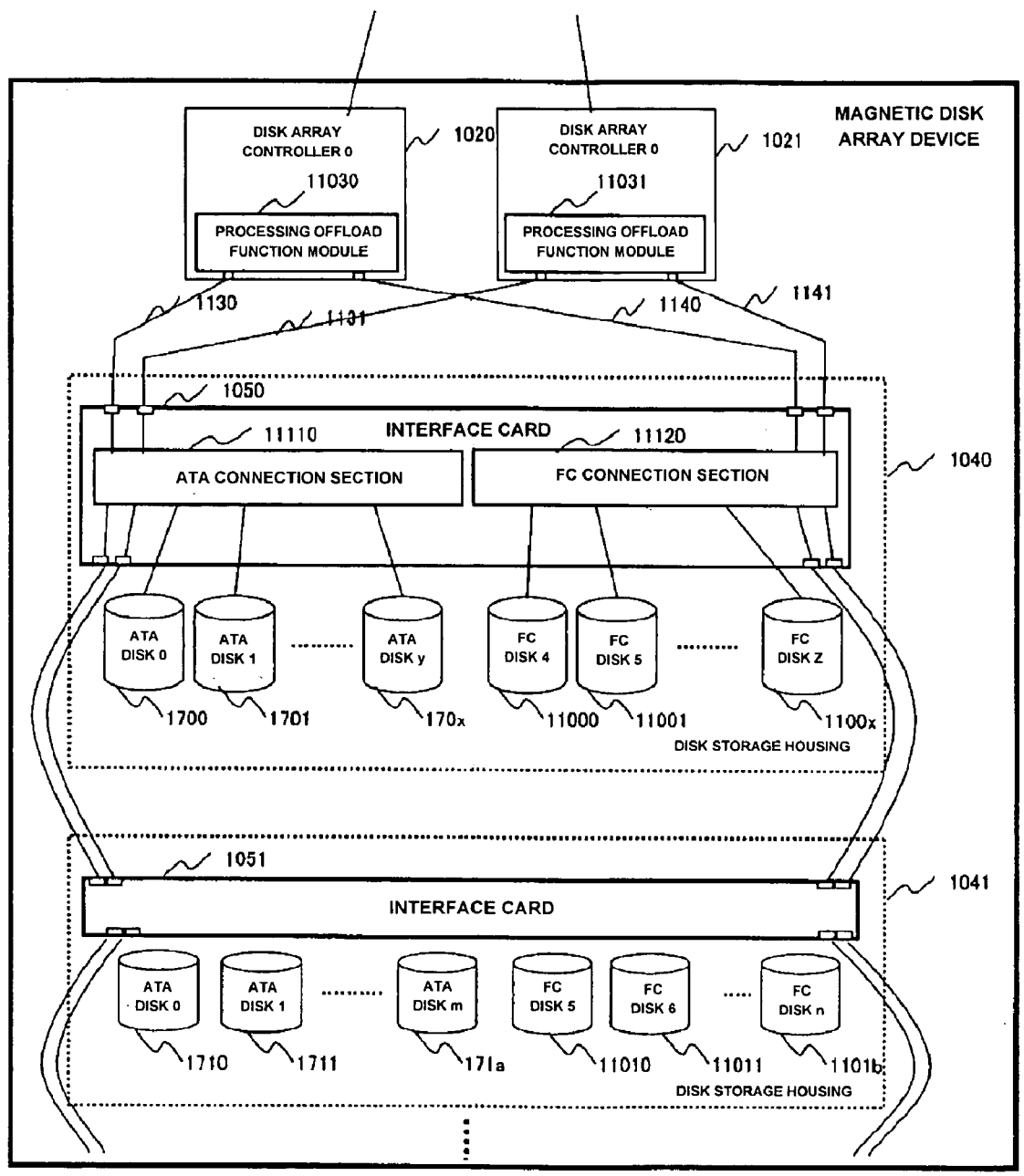
FIG. 10 is a block diagram of the overall configuration of a magnetic disk array device in accordance with a fourth embodiment of the present invention, in which a processing offload function module is mounted on a disk array controller.

FIG. 10 is a block diagram of the overall configuration of a magnetic disk array device in accordance with a fourth embodiment of the present invention, in which a processing offload function module is mounted on a disk array controller. FIG. 10 shows the configuration of a magnetic disk array device when at least one processing offload function module 1103x is mounted on at least one disk array controller 102x.

The disk array controller 102x on which is mounted the processing offload function module 1103x is connected to ATA disks 17xx and at least one FC disk 110xx via an ATA connection section 11110 that connects selectively to a plurality of ATA disks 17xx and an FC connection section 11120 that connects in a similar method to the FC disk 110xx, respectively. In FIG. 10, x, y, z, a, b, m and n can be any natural number.

Although FIG. 10 shows ATA disks and FC disks, other types of disks may be combined. For example, ATA disks and SAS (Serial Attached SCSI) may be combined. Furthermore, there may be two or more types of magnetic disks.

According to the fourth embodiment of the present invention, the disk array controller is required to be able to issue only one type of command and is not required to prepare a different type of command for each disk interface connected in lower order; instead, optimal command processing according to each disk can be executed as in the third embodiment. Furthermore, due to the fact that the processing offload function module is mounted on the disk array controller, the protocol between a disk array controller processing section (having a configuration similar to the one shown in FIG. 2) and the processing offload function module may be a third command system that is vendor-unique.

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A disk array system comprising:
at least one ATA magnetic disk;
at least one disk array controller for controlling the ATA magnetic disk; and
at least one interface card having a processing offload function module, existing on a path between the disk array controller and the ATA magnetic disk,
wherein the disk array controller outputs to the interface card one of a standard processing FC command for performing a standard processing, and an offload processing FC command for performing a vendor-unique offload processing,
wherein the processing offload function module includes a command analysis processing section, an operation processing section, a data buffer, an ATA connection interface, an ATA command mapping table, and a disk ID information management table which records relationships between FC IDs and ATA connection interface numbers for managing correlation between the FC IDs and the corresponding ATA magnetic disk and thus realizing indirect allocation of the FC IDs,
wherein, when the processing offload function module receives the standard processing FC command sent from the disk array controller, the command analysis processing section determines whether the standard processing FC command can be mapped onto an ATA command, and if the standard processing FC command can be mapped onto an ATA command, the command analysis processing section uses the ATA command mapping table to select the ATA command that corresponds to the standard processing FC command, prepares in the data buffer the ATA command selected thereby, the ATA connection interface number that can be obtained through correlation with the FC ID from the disk ID information management table and if necessary a storage number for storing data that is obtained by executing the ATA command, and issues the ATA command to the ATA magnetic disk via the ATA connection interface with the ATA connection interface number designated in the data buffer, and
wherein, when the processing offload function module receives the offload processing FC command sent from the disk array controller, the operation processing section takes over the offload processing FC command from the command analysis processing section and prepares a group of ATA commands for the offload processing FC command which achieve an optimal offload processing in an ATA protocol, and computes when necessary.

2. A disk array system according to claim 1, wherein the disk array controller includes an offload processing discrimination section for discriminating whether the processing offload function module is present within the disk array system and if there is a usable offload processing.

3. A disk array system according to claim 1, wherein, when the offload processing FC command is a write with parity computation for writing a new data in the ATA magnetic disk, the disk array controller refers to a disk information management table including at least one processing offload function provided by the processing offload function module and indicating which processing offload function can be used on each of the ATA magnetic disk, discriminates whether the ATA magnetic disks of data write destinations can execute the write with parity computation, and if the ATA magnetic disks are found to be able to execute the write with parity computation, issues a vendor-unique offload command for instructing the write with parity computation to one of the ATA magnetic disks that is the write data destination, and the processing offload function module receives the vendor-unique offload command in place of the ATA magnetic disk, and the operation processing section of the processing offload function module issues an ATA read command to read an old data and old parity from the ATA magnetic disk, executes computation of a new parity, and issues a write command to write the new data and new parity in the ATA magnetic disk.

4. A disk array system according to claim 1, wherein, when the offload processing FC command is an online multiple disk verification, the disk array controller issues a vendor-unique offload command for executing the online multiple disk verification, which contains a command identification number and a list of IDs of the ATA magnetic disks that are targets of simultaneous execution, to a representative disk that is one of the ATA magnetic disks assigned IDs on the list, and the processing offload function module receives the vendor-unique offload command in place of the representative disk, and the operation processing section of the processing offload function module takes over the offload processing FC command from the command analysis processing section, and issues a read command simultaneously to a plurality of the ATA magnetic disks corresponding to IDs provided in the list.

5. A processing offload function module in an interface card existing on a path between at least one ATA magnetic disk and a disk array controller that controls the ATA magnetic disk, the processing offload function module comprising:
- a section that receives from the disk array controller one of a standard processing FC command for performing a standard processing, and an offload processing FC command for performing a vendor-unique offload processing;
- a ATA connection interface that sends an ATA command to the ATA magnetic disk:
- a disk ID information management table that records relationship between FC IDs and ATA connection interface numbers for managing correlation between the FC IDs and the corresponding ATA magnetic and thus realizing indirect allocation of the FC IDs:
- a section that, when a FC command from the disk array controller is the standard processing FC command, determines whether the standard processing FC command can be mapped onto an ATA command, and if the standard processing FC command can be mapped on an ATA command, uses an ATA command mapping table to select the ATA command that corresponds to the standard processing FC command, prepares the ATA command selected thereby, the ATA connection interface number that can be obtained from a disk ID information management table and if necessary a storage number for storing data that is obtained by executing the ATA command, and issues the ATA command to the ATA magnetic disk via the ATA connection interface with the ATA connection interface number; and
- a section that, when a FC command from the disk array controller is the offload processing FC command, takes over the offload processing FC command from the command analysis processing section and prepares a group of ATA commands for the offload processing FC command which achieve an optimal offload processing in an ATA protocol, and computes when necessary.

6. A processing offload function module according to claim 5, wherein the offload processing FC command is one of a write command with parity computation, an online multiple disk verification command, a RAID format command, and an inter-disk copy command.

7. A disk array system including a plurality of ATA magnetic disks, at least one disk array controller for controlling the ATA magnetic disks, and at least one interface card existing on a path between the disk array controller and the ATA magnetic disks, the disk array system comprising:
- at least one disk storage housing containing a processing offload function module that connects to the ATA magnetic disks,
- wherein the disk array controller outputs to the interface card one of a standard processing FC command for performing a standard processing, and an offload processing FC command for performing a vendor-unique offload processing,
- wherein the processing offload function module includes a command analysis processing section, an operation processing section, a data buffer, an ATA connection interface, an ATA command mapping table, and a disk ID information management table which records relationship between FC IDs and ATA connection interface numbers for managing correlation between the FC IDs and the corresponding ATA magnetic and thus realizing indirect allocation of the FC IDs,
- wherein, when the processing offload function module receives the standard processing FC command sent from the disk array controller, the command analysis processing section determines whether the standard processing FC command can be mapped onto an ATA command, and if the standard processing FC command can be mapped onto an ATA command, the command analysis processing section uses the ATA command mapping table to select the ATA command that corresponds to the standard processing FC command, prepares in the data buffer the ATA command selected thereby, the ATA connection interface number that can be obtained through correlation with the FC ID from the disk ID information management table and if necessary a storage number for storing data that is obtained by executing the ATA command, and issues the ATA command to the ATA magnetic disk via the ATA connection interface with the ATA connection interface number designated in the data buffer, and
- wherein, when the processing offload function module receives the offload processing FC command sent from the disk array controller, the operation processing section takes over the offload processing FC command from the command analysis processing section and prepares a group of ATA commands for the offload processing FC command which achieve an optimal offload processing in an ATA protocol, and computes when necessary.

8. A disk array system according to claim 7, wherein the offload processing FC command is one of a write command with parity computation, an online multiple disk verification command, a RAID format command, and an inter-disk copy command.

9. A disk array system comprising a plurality of magnetic disks, at least one disk array controller for controlling the magnetic disks, and at least one interface card having a processing offload function module existing on a path between the disk array controller and the magnetic disks,
- wherein the plurality of magnetic disks include at least one ATA magnetic disk and at least one FC magnetic disk mixed therein,
- wherein the disk array controller outputs to the interface card one of a standard processing FC command for performing a standard processing, and an offload processing FC command for performing a vendor-unique offload processing, wherein the processing offload function module includes a command analysis processing section, an operation processing section, a data buffer, an ATA connection interface, an ATA command mapping table, and a disk ID information management table which records relationship between FC IDs and ATA connection interface numbers for managing correlation between the FC IDs and the corresponding ATA magnetic and thus realizing indirect allocation of the FC IDs, wherein, when a FC command from the disk array controller is the standard processing FC command and is to access the FC magnetic disk, the processing offload function module passes the standard processing FC command to the FC magnetic disk without any processing rendered thereon, and wherein, when a FC command from the disk array controller is the standard processing FC command and is to access the ATA magnetic disk, the command analysis processing section of the processing offload function module determines whether the standard processing FC command sent from the disk array controller can be mapped onto an ATA command onto an ATA command, and if the standard processing FC command can be mapped, the command analysis processing section uses the ATA command mapping table to issue to the ATA magnetic disk an ATA command that corresponds to the standard processing FC command, prepares in the data buffer the ATA command selected thereby, the ATA connection interface number that can be obtained through correlation with the FC ID from the disk ID information management table and if necessary a storage number for storing data that is obtained by executing the ATA command, and issues the ATA command to the ATA magnetic disk via the ATA connection interface with the ATA connection interface number designated in the data buffer, and wherein, when a FC command from the disk array controller is the offload processing FC command, the operation processing section of the processing offload function module takes over the offload processing FC command from the command analysis processing section and converts the FC command into a group of commands that achieve optimum operation according to the type of the magnetic disks to be accessed and processing contents.

10. A disk array system according to claim 9, wherein the offload processing FC command is one of a write command with parity computation, an online multiple disk verification command, a RAID format command, and an inter-disk copy command.

11. A disk array system comprising a plurality of magnetic disks, at least one disk array controller for controlling the magnetic disks, and at least one interface card existing on a path between the disk array controller and the magnetic disks, wherein the plurality of magnetic disks include at least one ATA magnetic disk and at least one FC magnetic disk mixed therein, wherein the disk array controller includes a controller processing section that is connected to a processing offload function module provided for the disk array controller, wherein the controller processing section outputs to the processing offload function module one of a standard processing FC command for performing a standard processing, and an offload processing FC command for performing a vendor-unique offload processing, wherein, when a FC command from the disk array controller is the standard processing FC command and is to access the FC magnetic disk, the processing offload function module passes the standard processing FC command via the interface card to the FC magnetic disk without any processing rendered thereon, wherein the processing offload function module includes a command analysis processing section, an operation processing section, a data buffer, an ATA connection interface, an ATA command mapping table, wherein, when a FC command from the disk array controller is the standard processing FC command and is to access the ATA magnetic disk, the command analysis processing section of the processing offload function module determines whether the standard processing FC command can be mapped onto an ATA command, and if the standard processing section uses the ATA command mapping table to select the ATA command that corresponds to the standard processing FC command, prepares in the data buffer the ATA command selected thereby and if necessary a storage number for storing data that is obtained by executing the ATA command, and issues the ATA command via the interface card to the ATA magnetic disk, and wherein, when a FC command from the disk array controller is the offload processing FC command, the operation processing section of the processing offload function module takes over the offload processing FC command from the command analysis processing section and converts the FC command into a group of commands that achieve optimum operation according to the type of the magnetic disks to be accessed and processing contents.

12. A disk array system according to claim 11, wherein, when a FC command from the disk array controller is the offload processing FC command, the processing offload function module converts the offload processing FC command into a group of commands that achieve optimum operation according to the type of the magnetic disks to be accessed and processing contents.

* * * * *